G. M. LONGACRE.
Evaporating Pan.
No. 25,341.  
Patented Sept. 6, 1859.
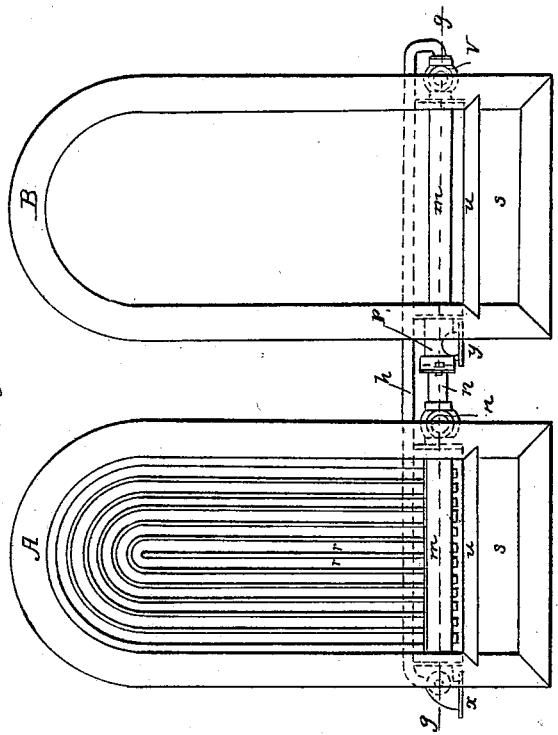
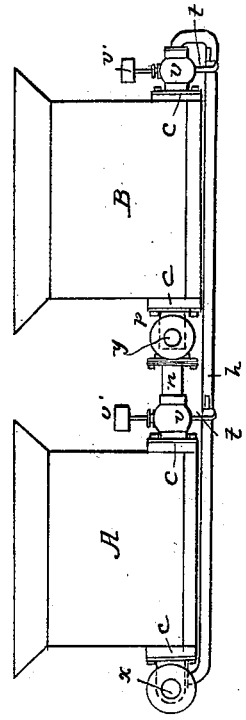
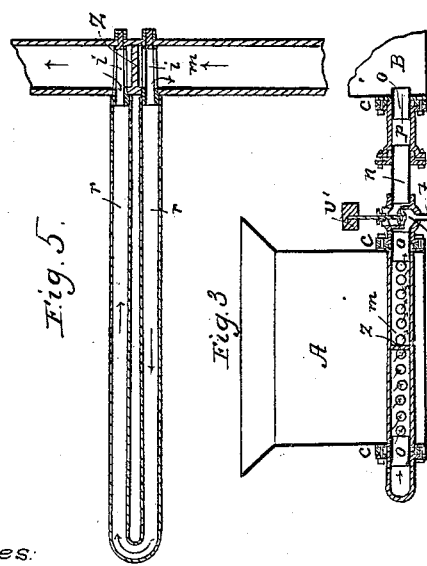
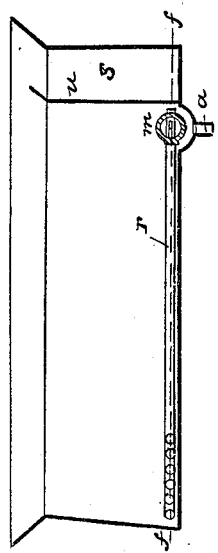

UNITED STATES PATENT OFFICE.

GEO. M. LONGACRE, OF NEW ORLEANS, LOUISIANA.

IMPROVEMENT IN STEAM-PANS FOR CLARIFYING SUGAR.

Specification forming part of Letters Patent No. 25,341, dated September 6, 1859.

*To all whom it may concern:*

Be it known that I, GEORGE M. LONGACRE, of the city of New Orleans, parish of Orleans, State of Louisiana, have made a new and useful Improvement in Steam-Pans to Clarify and Evaporate Cane-Juice; and I hereby declare the following to be a full, clear, and exact description thereof, reference being had to the accompanying drawings, and to the letters of reference marked thereon, making a part of this specification, the same letters designating the same parts shown in the respective figures.

Figure 1 is a top view; Fig. 2, an end elevation; Fig. 3, a sectional end elevation of one pan, taken from line $g$ in Fig. 1, Figs. 4 and 5 made to show parts to be referred to in pointing out the mechanical arrangement.

This arrangement of pans is more particularly intended for clarifying the juice than for the evaporation, although applicable for both purposes.

I make use of the escape-steam from the cylinder of the steam-engine that is furnishing the power to grind the cane to heat the juice, and as the heating of the juice retards the action of condensation, which would have a tendency to increase the force of back-pressure on the piston without the employment of a relief-valve placed between the engine and the pan to relieve the pressure thus accumulating, and causing a loss of steam in the same ratio as the relief, in this arrangement I avoid placing a relief-valve between the steam-cylinder and the pan, and secure having all the steam to enter the pipes of the pan which is in connection with the cylinder, and place the relief-valve so that such pan, thus connected, stands between the steam-cylinder and itself, to insure such steam not condensed in the pan directly connected with the cylinder passing on and entering the pipes of the next pan, and to be there employed in the heating the juice therein, the relief-valve thus filling a double office in the retaining the back-pressure uniform, and securing the surplus steam being made useful.

In the discharge of the surplus steam from the first pan, the water from condensation in the pipes of the same pan, if allowed to enter those of the second pan, would retard the efficiency of the steam in heating-power. To remove this water I have a pump attached to the chamber of the relief-valve, to draw such water off and separate the steam from the water before it can enter the pan.

In the clarification of juice the heat cannot be allowed to act on it continuously; but as soon as the proper temperature has been obtained it must be suspended to admit the skimming to be performed without the agitation.

The supply of steam from the engine when running being continuous, I make arrangements to change the connection of the cylinder with the different pans separately, to allow the heating process to be going on in such pans during the time the skimming is being done in the others.

I will now refer to the drawings to explain the mechanical arrangement.

The pans A and B are both made the same, as others must be, by the increase of numbers in pans. The pan B is not represented, having pipes $r$, as shown in pan A. Still, this pan is to have them the same. These pipes are made and attached to pipe $m$, as seen in Fig. 5, showing only two pipes, and a sectional view of them and pipe $m$, taken from $f$ in Fig. 4, the pipe $m$ having a division in the middle, (marked $Z$,) and the ends of pipes $r$ being on either side of this division, the steam passing as indicated by the arrows. The ends of pipes $r$ pass through pipe $m$, and are made with valves at their shoulders, which corresponding valve-seats in pipe $m$ receive the valves. The part passing through $m$ makes a guide for the valves, and the nuts on the ends, in being screwed up, secure the valves fitting their seats and a tight joint being made.

There are openings in pipes $r$ for the steam to pass, (indicated by letter $i$ in Figs. 4 and 5.)

The pipes $m$ are made the same length as the inside width of the pan.

There are on the outside of the pans, and on a line with pipes $m$, chocks for the purpose of making a packed joint from $m$ to the parts attached, through which the steam passes in and out of the pans. These chocks are designated by letter $c$, and the parts to be joined by X and P, both being pipes, and valves V, and through these joints are pipes $o$, for the purpose of supporting the joints and allowing the pipes $m$ to turn so the pipes $r$ can be turned up to clean them.

In Fig. 3 the steam is supposed to pass as indicated by the arrows, entering the pipes $r$ on one side of Z and returning to $m$ on the other, passing through valve V, and continuing on through pipes $n$ and P, going into pan B. This valve is made of the usual construction, and having a weight on the stem of a limited amount to retain as much pressure in the first pan as may be an advantage to insure the steam operating well and to regulate the force of back-pressure on the piston. The small check-valve $t$ is connected to a pump by a pipe which draws the water from condensation away before the steam can enter the second pan, to thus separate the water from the steam to insure its heating effectively. All the pans have connections between them, the same as here shown, the valve being joined to pipe P by pipe $n$, which is attached to the valve, and by the use of a stuffing-box in P.

S represents skimming-troughs, made in the pans by the division-plate $u$, having the usual arrangement to draw off the settled juice.

$a$ is a valve to discharge the juice from the pan.

I omit showing the pipes leading from the cylinder to the pans to conduct the steam, as this is only a common pipe having capacity for this purpose. It must have, however, branches to attach to the first pan and to each of the pipes P, and in each branch is a valve for the purpose of admitting steam.

In the operation of using the pans the manner of allowing the steam to enter and continue from one pan to the other, which is not condensed, and the mode of making the first pan second and the second first, and so on throughout a series in number of more pans in use, can be understood from the describing the operation of two pans. Supposing the branch of the steam-pipe connected to X on pan A is opened by having its valve raised to admit the steam, the valve in the branch attached to P by flange $y$ is closed. Therefore any steam which may enter pan B has first to pass through pan A, thus making B the second pan; and if B is made the first the valve admitting the steam direct into A is closed and that into B opened, such steam leaving B passing through pipe $h$ and entering pan A. If other pans are placed in the range to make out the number, as has been stated, or such number required, the next pan to B would be supplied from B, in the same manner as has been set forth B has been supplied from A, and this operation continued throughout the series. If the steam is distributed into two, three, or more pans at the same time, and can only pass into the pans as fast as it condenses, it is so much divided that neither one of the pans can be brought to a boiling-point without considerable more back-pressure on the piston than is required when applied in the manner I have described—namely, whatever steam is not condensed in the first pan passes on, after having passed through the pipes of the first pan, into the second, and so continued.

I do not claim, broadly, the use of the exhaust-steam from the engine to clarify, or the use of a relief-valve to regulate the back-pressure on the piston; but

I claim—

In combination with the pans, the relief-valve V and the check-valve $t$, when arranged and operated as or substantially as and for the purpose herein set forth.

GEO. M. LONGACRE.

Witnesses:
W. E. THOMPSON,
THEO. I. THOMPSON.